United States Patent [19]

Thomas

[11] Patent Number: 4,887,331
[45] Date of Patent: Dec. 19, 1989

[54] SELF-RETAINED ONE-PIECE PIVOT BUSHING

[75] Inventor: Robert M. Thomas, South Lyons, Mich.

[73] Assignee: Chrysler Motors Corporation, Highland Park, Mich.

[21] Appl. No.: 345,337

[22] Filed: May 1, 1989

[51] Int. Cl.⁴ .................................................. F16L 5/00
[52] U.S. Cl. ........................................... 16/2; 384/217; 384/296; 384/539
[58] Field of Search ...................... 16/2, 273; 384/903, 384/539, 217, 296

[56] References Cited

U.S. PATENT DOCUMENTS

| RE. 30,850 | 1/1982 | Gordy et al. | 16/2 |
|---|---|---|---|
| 2,255,971 | 9/1941 | Hall . | |
| 2,424,757 | 7/1947 | Klumpp | 16/2 |
| 3,065,035 | 11/1962 | Biesecker . | |
| 3,186,287 | 6/1965 | Wehlau . | |
| 3,438,686 | 4/1969 | Stone . | |
| 4,333,361 | 6/1982 | Spease . | |
| 4,675,937 | 6/1987 | Mitomi | 16/2 |
| 4,757,664 | 7/1988 | Freissle | 16/2 |
| 4,773,279 | 9/1988 | Spease et al. . | |

Primary Examiner—Nicholas P. Godici
Assistant Examiner—James Miner
Attorney, Agent, or Firm—Edward P. Barthel

[57] ABSTRACT

A pivot bushing comprises a tubular body defining a bore adapted to receive a pivot pin and includes a radially enlarged peripheral flange and at least one resilient finger extending radially outwardly from one end of the body and facing toward the peripheral flange. The free end of each finger is axially spaced from the annular surface of the peripheral flange so as to receive an apertured support panel therebetween. The tubular body also includes a radially expanded shoulder adjacent the peripheral flange and having a periphery formed with a cone surface dimensioned to matingly engage with the aperture in the support panel in a self-centering manner. The components are unitarily formed from a siingle bearing body.

4 Claims, 1 Drawing Sheet

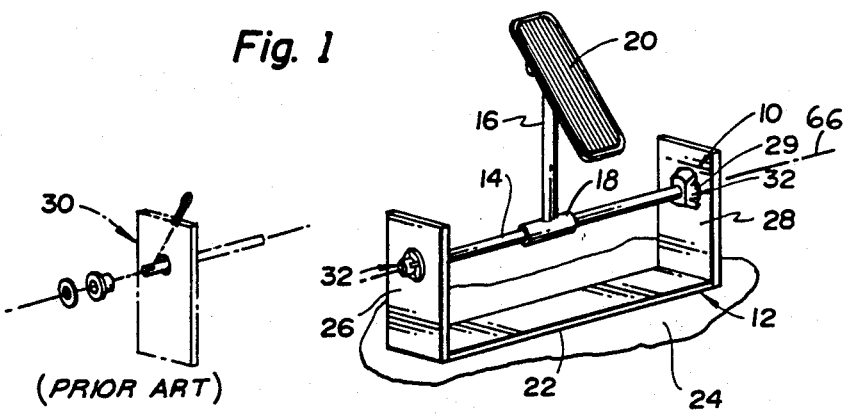
Fig. 1
Fig. 1A (PRIOR ART)
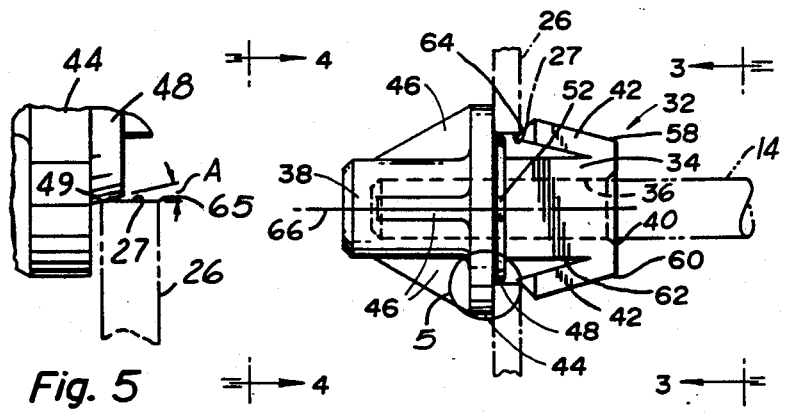
Fig. 5
Fig. 2
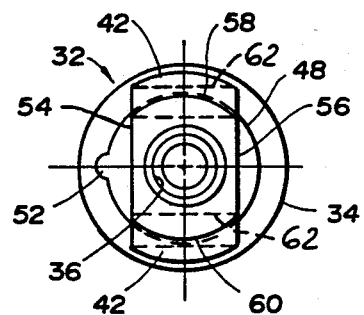
Fig. 3
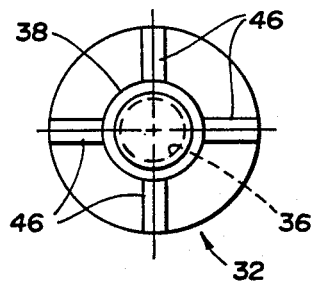
Fig. 4

SELF-RETAINED ONE-PIECE PIVOT BUSHING

BACKGROUND OF THE INVENTION

1. Field Of The Present Invention

The present invention relates generally to bushings forming a bearing surface for a pivot pin inserted within an aperture in a support member, and more particularly to such a bearing having retaining means integrally formed on the bushing.

2. Description Of The Prior Art

Tubular bushings are often inserted through apertures in a support member to provide a bearing surface for a pivot pin extending through the aperture. For example, in a particular motor vehicle construction in which the accelerator pedal support is pivotally mounted with respect to the floor of a vehicle body, a bracket includes spaced flanges having registering apertures that receive a pivot pin therethrough. While bushings may be inserted through the apertures in the flanges, such bushings are often retained within the apertures by retaining means formed on or applied to the pivot pin to restrict axial displacement of the pivot pin, whereby the bushing is entrained in position with respect to the support flange. Moreover, although it has been known to provide an enlarged shoulder at one end of the bushing to provide an abutment surface which resists axial displacement of the bushing in one direction, the bushing is typically entrained within the aperture only by means which axially entrains the pivot pin in a relatively fixed axial position with respect to the support flanges. The typical means for axially entraining the pin within the bracket often comprises a washer which is inserted over the end portion of the pivot pin extending outwardly of the flange and which rests against the raised shoulder on the bushing, and retention means such as a nut threadably engaged on the end portion of the pivot pin or a cotter pin extending through a transverse opening in the pin adjacent the axial position of the washer.

While the previously known accelerator pivot mechanism discussed above is common, it may be appreciated that such a construction requires the production and assembly of numerous parts in order to provide an operative assembly. Moreover, each of the parts must be assembled in the proper sequence to assure proper operation of the assembly. Thus, the repetition of the numerous steps necessary to produce and assemble the previously known accelerator pivot assembly substantially compounds the complexity of the mass production of motor vehicles by increasing the time and labor required to construct the assembly and by increasing the number of parts which must be manufactured, transported from several sources and sorted to predetermined work stations along the mass production assembly line.

One previously known bushing which is provided with means for entraining the bushing within an aperture in a support member is disclosed in U.S. Pat. No. 3,065,035 to Biesecker. Biesecker discloses a bushing having an enlarged flange at one end and a tubular body enclosed at the other end. A metal sleeve adapted to fit over the tubular body includes a retaining ridge adapted to be received within a peripheral groove in the tubular body. The sleeve also includes radially outwardly biased fingers which extend toward the enlarged flange on the tubular body. While such a structure substantially reduces the time necessary to install the bushing within the aperture of the support member, the separate construction of the tubular member and the metal sleeve still requires a separate assembly step for the bushing and its retaining means. As a result, such a construction still requires the time and expense necessary to consolidate the manufacturing, transport, and timely support of the components at the assembly station for the pivot assembly.

Another previously known bushing is shown in U.S. Pat. No. 3,186,287 to Wehlau. Wehlau discloses a bearing bush which includes conical projections spaced axially apart from an expanded shoulder at one end of a tubular body. The projections are formed on a resiliently deformable wall portion of the bush so that they can be wedged through an aperture in a support member. Unfortunately, it may be appreciated that substantially the same force used to install the bushing within a fixed position within the aperture in the support member can also be used to dislodge the bush from the support member when applied in the opposite direction. As a result, the strength of the retaining means in such a bushing is more limited than in other known bushing retaining structures.

SUMMARY OF THE PRESENT INVENTION

The present invention overcomes the above-mentioned disadvantages by providing a pivot bushing having a tubular body that is provided with at least one, and preferably, a pair of fingers biased radially outwardly from the body and facing toward a radially expanded flange on the bushing. Thus, as the fingered end of the bushing is inserted through the aperture in the support member, the fingers are resiliently deflected toward a position which enables them to pass through the aperture while permitting them to expand radially outwardly after insertion through the aperture to press the support member against the radially expanded flange on the body of the bushing at a position radially spaced from the tubular body. As a result, the bushing is fixedly entrained within the aperture of the support member and resists removal with substantially greater force than was necessary to install the bushing in support member.

In one preferred embodiment, the tubular body of the bushing includes a radially expanded shoulder with its periphery having an exterior cone surface correspondingly dimensioned within the periphery of the aperture in the support member so as to matingly engage the periphery of the aperture and maintain the hollow chamber within the bushing in a fixed radial position with respect to the aperture. In addition, an axially elongated portion of the tubular body serves to strengthen the radially expanded flange by providing support for gussets extending between the axially extended end and the radially expanded flange. The gussets also provide additional support for a seal at one end of the chamber in the tubular body, whereby a pair of such bushings receiving opposite ends of the pivot pin axially entrain the pivot pin between the installed bushings. In the preferred embodiment, an accelerator pivot assembly is shown employing each of these features, although it will be understood that the pivot bushing of the present invention may also be utilized in a variety of other assemblies without departing from the scope and spirit of the present invention.

Thus, the present invention provides a pivot bushing which is substantially easier to install than previously known accelerator pivot assemblies. In addition, the bushing substantially reduces the number of parts required and production processes which must be performed before and during the assembly of a motor vehicle, especially on a mass production basis. As a result, the pivot bushing is substantially more economical to produce and install than previously known bushing retaining assemblies. In addition, the retaining means of the bushing provides substantially greater retaining strength than some previously known self-retaining bushing constructions. These and other advantages will be further described in the detailed description which follows.

BRIEF DESCRIPTION OF THE DRAWINGS

The present invention will be better understood by reference to the following detailed description of a preferred embodiment when read in conjunction with the accompanying drawing in which like reference characters refer to like parts throughout the view and in which:

FIG. 1 is a perspective view of an accelerator pivot assembly incorporating the pivot bushing of the present invention;

FIG. 1A is a perspective view of an example of a prior pivot bushing;

FIG. 2 is an enlarged front view of a pivot bushing constructed in accordance with the present invention;

FIG. 3 is a side view of the pivot bushing shown in FIGS. 1 and 2;

FIG. 4 is a further side view of the pivot bushing shown in FIGS. 1-3; and

FIG. 5 is an enlarged view of the portion of the pivot bushing shown within the dashed-line circle in FIG. 2.

DETAILED DESCRIPTION OF A PREFERRED EMBODIMENT

Referring first to FIG. 1, an accelerator pivot assembly 10 comprises a bracket 12 adapted to support a pivot pin 14 which is in turn coupled to one end of an accelerator pedal support arm 16. The support arm 16 is secured by appropriate means such as a key, spline or set screw connection between the sleeve 18 and the pivot pin 14 for rotation with the pivot pin 14. The other end of the support arm 16 is pivotally secured to an accelerator pedal 20.

The support bracket 12 comprises a base 22 which is anchored by appropriate means such as welds, bolts or the like to the flooring structure 24 of a motor vehicle (not shown). The base 22 includes a pair of substantially parallel support panels or bracket raised panels 26 and 28 each having a circular aperture 27 registering with each other to define the axis for the pivot pin 14. A previously known construction for retaining the pivot pin 14 in the registering apertures of the raised panels 26 and 28 is shown in phantom line at 30 in FIG. 1A. However, as shown in solid lne in FIG. 1, this plurality of components is replaced in the present invention with a one-piece self-retained pivot bushing 32 installed in each of the raised panels 26 and 28.

Referring now to FIG. 2, the pivot bushing 32 is formed from a suitable plastic materials, comprises a tubular body 34 defining a central bore 36 one end of the bore is closed by an endwall 38. The tubular body 34 is substantially smaller than the aperture 27 in the raised panel 26 shown in FIG. 2 for insertion therethrough. The other end 40 of the tubular body 34 supports fingers 42 resiliently biased radially outwardly from the tubular body 34 and facing toward the other end of the tubular body 34. The U.S. Pat. No. 4,333,361 issued June 8, 1982 to A. L. Spease discloses a Remote Control Swivel Joint having flexible legs similar to the support fingers 42 incorporated in the present invention.

The tubular body also includes a radially expanded peripheral flange 44 having an annular surface adapted to abut against the side of the raised panel 26. The flange 44 is axially spaced from the end 40 of the tubular body 34 and the position at which the fingers 42 are connected so that the raised panel 26 can be entrained between the peripheral flange 44 and the fingers 42 raised panel 26 of the bracket 12.

The radially enlarged flange 44 is reinforced about the axially extending portion of the tubular body 34 extending toward the endwall 38 by gussets 46 secured along abutting edges to the tubular body 34 and the peripheral flange 44, respectively. As best shown in FIG. 4, the gussets 46 also provide a convenient means for grasping the tubular body and rotating it to a desired orientation within the aperture 27 as will be described in greater detail hereinafter.

The pivot bushing 32 of the preferred embodiment also includes a radially expanded shoulder 48. As seen in FIGS. 2 and 5, the periphery of the shoulder 48 has an exterior tapered or cone surface formed with a cone angle "A" of about five degrees from the horizontal. The cone surface is dimensioned to correspond with the maximum tolerance diameter of the circular aperture 27 ensuring that the aperture circular outer edge 49 contacts a portion of the cone surface. Thus, if the aperture is cut within its minimal tolerance diameter the cone surface will enable the aperture edge 49 to remain in contact with cone surface of shoulder 48. The shoulder 48 cone surface retains the bore 36 in a fixed radial position with respect to the aperture 27. Thus, the shoulder may be particularly configured with a desired shape to prevent rotation of the pivot bushing 32 with respect to the raised panel 26. For example, as shown in FIG. 3, the periphery of the shoulder 48 may include a projection 52 adapted to mate with a correspondingly sized recess in the periphery of the aperture 27.

Referring now to FIG. 3, the fingers 42 are unitarily formed with the tubular body 34. For example, the tubular body 34 may be originally formed from a cylindrical body truncated along the side 54 and 56 to save on the amount of material used in constructing the bushing and to minimize the weight of the bushing. The wider sides 58 and 60 are then cut along the truncation line as shown at 62 to a point spaced axially from the end 40 of the tubular body 24 (two places) to form the fingers 42. The free or cut ends of the fingers 42 are then urged radially outwardly from the truncation line 62 and heat set or otherwise aligned to assume a radially spaced position facing toward the radially enlarged flange 44. The free ends can then be cut as shown in FIG. 2 to provide an abutment edge 64 engaging inner circular edge 65 of the aperture 27.

Preferably, the free ends of the fingers 42 are resiliently urged toward a radially expanded position radially outwardly of the cone surface periphery of the shoulder 48. On the other hand, the maximum width between the sides 58 and 60 is less than the breadth of the corresponding peripheral cone surface portion of the shoulder 48 to permit easy insertion of the end 40 of the tubular body 34 within the aperture 27.

While the previous discussion particularly refers to insertion of a pivot bushing 32 within the raised bracket panel 26, it is to be understood that the pivot bushing 32 is likewise insertable in substantially the same manner but in the opposite direction through the aperture 27 in the raised panel 28. Furthermore, it will be readily understood that once the pivot pin 14 has been generally aligned to extend through the apertures 27 and 29 in the bracket panels 26 and 28 respectively, the end 40 of the pivot bushing 32 is inserted through the aperture 27 over the end of the pivot pin. While the fingers 42 are temporarily deflected downwardly toward the tubular body 34, the axial spacing between the free ends of the fingers 42 and the radially expanded peripheral flange 44 permits the raised panel 26 to be received therebetween. As a result, the means for resiliently deflecting the fingers outwardly enables the diametrically opposed fingers 42 to assume the position shown in solid line in FIG. 2. The resilient fingers provide a resilient axial force ensuring biting contact of the circular edge 49 on the cone surface of shoulder 48 so as to prevent removal of the pivot bushing 32 from the panel aperture 27.

Moreover, the shoulder 48 configures to matingly engage the periphery of the aperture 27 assures that pivot axis 66 of the pivot pin remains fixed at a predetermined location. Such a shoulder permits a greater tolerance in the axial distance between the radially expanded flange 44 and the abutment edges 64 of the fingers 42, and permits greater tolerance in the radial position of the edge 64 from the principal axis of the tubular body 34 since the pivot axis 66 is fixedly positioned by the shoulder 48. Moreover, positioning of the shoulder 48 adjacent the reinforced peripheral flange 44 further assures proper alignment of the pivot pin 14 on the bracket pivot axis 66.

As a result, the accelerator pivot assembly of the present invention is substantially easier to install than previously known pivot assembly structures. Moreover, the structure is substantially more economical to produce and substantially reduces the complexity of consolidating the manufacturing, the supplying and the assembly of the pivot assembly in the mass production of motor vehicles. Nevertheless, it will be understood that the pivot bushing is well adapted for use in other assemblies, including those not related to the production of motor vehicles.

Having thus described my invention, many modifications thereto will become apparent to those skilled in the art to which it pertains without departing from the scope and spirit of the present invention as defined in the appended claims.

What is claimed is:

1. In combination with a radially extending member supported for pivotal movement about the pivot axis of a pivot pin, said pivot pin engaged within a metal bracket having a pair of parallel raised panels, each said panel including a circular aperture aligned with said pivot axis defining outer and inner circular edges, pivot bushing means supporting each end of said pivot pin in an associated one of said apertures, the improvement comprising:

a pair of tubular one-piece bushings formed of plastic material, each said bushing having a body dimensioned to be axially received in one of said apertures in a self-retained manner, each said bushing body having a central bore one end of which is closed by an endwall;

at least one radially expanded peripheral flange unitarily formed on said body and having a diameter a predetermined dimension greater than the diameter of its associated panel aperture;

each said bushing having a pair of fingers equidistantly spaced from each other about the circumference of its body, said pair of fingers protruding outwardly from and constructed unitarily with said body at a position axially spaced from its flange, and means for resiliently urging said fingers outwardly from said body;

each said bushing body formed with a radially expanded shoulder extending from said flange axially toward said aperture with its periphery having an exterior cone surface defining a predetermined cone angle and dimensioned to correspond with the size of its associated aperture with the cone surface engaged by its associated aperture outer circular edge so as to retain its central bore in a fixed radial position with respect to its aperture;

upon said pivot pin being generally aligned on said pivot axis such that each end thereof extends through an associated panel aperture wherein the open end of each said bushing body is inserted through its associated aperture whereby each pivot pin end is telescopically received in its associated bushing central bore while its fingers are temporarily deflected radially inwardly toward its tubular body such that its associated panel is received between its peripheral flange and its fingers; and whereby upon each bushing pair of fingers being resiliently deflected radially outwardly to their normal position thereby exerting an axial force providing biting engagement of each aperture outer circular edges on its associated cone surface thereby preventing the removal of said pivot bushings and said pivot pin from said raised panel apertures.

2. In the combination as set forth in claim 1, wherein each said bushing shoulder including a radial projection adapted to mate with a corresponding sized recess in the periphery of its associated aperture thereby retaining each said bushing bore in a fixed radial position with respect to its associated aperture.

3. In the combination as set forth in claim 1, wherein each said bushing radially enlarged flange being reinforced about the axially extending portion of its tubular body extending toward its endwall by a plurality of gussets secured along abutting edges with its tubular body and its peripheral flange.

4. In the combination as set forth in claim 1, wherein said cone angle is of the order of five degrees.

* * * * *